(12) United States Patent
Dieterich

(10) Patent No.: US 6,219,067 B1
(45) Date of Patent: Apr. 17, 2001

(54) MEASURES FOR CHARACTERIZING COMPRESSED BITSTREAMS

(75) Inventor: Charles Benjamin Dieterich, Kingston, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/143,912

(22) Filed: Aug. 31, 1998

Related U.S. Application Data

(60) Provisional application No. 60/080,716, filed on Apr. 3, 1998.

(51) Int. Cl.[7] .............................. H04N 5/91; H04N 7/00; G09G 5/36
(52) U.S. Cl. .................. 345/440; 348/845.3; 386/61; 386/65; 386/71
(58) Field of Search ................................. 345/133, 134, 345/440, 302; 348/845.1, 845.2, 845.3, 500, 423, 464; 386/61, 65, 71, 95, 98, 111, 131; 358/311, 357; 382/232, 235, 236; H04N 5/76, 5/781

(56) References Cited

U.S. PATENT DOCUMENTS

| | | | |
|---|---|---|---|
| 5,535,193 | * | 7/1996 | Zhang .................................... 370/17 |
| 5,640,388 | * | 6/1997 | Woodhead ........................... 370/468 |
| 5,889,562 | * | 3/1999 | Pau ....................................... 348/459 |
| 5,894,328 | * | 4/1999 | Tahara .................................. 348/462 |
| 5,923,869 | * | 7/1999 | Fashiwagi ............................ 345/302 |
| 6,026,232 | * | 2/2000 | Yogeshwar ........................... 358/311 |
| 6,064,796 | * | 4/1999 | Nakamura ............................. 386/95 |

FOREIGN PATENT DOCUMENTS

| | | | | |
|---|---|---|---|---|
| 0712247 | * | 9/1998 | (EP) | ............................. H04N/5/926 |
| 9700904 | * | 9/1998 | (SE) | ................................ H04N/7/62 |

\* cited by examiner

*Primary Examiner*—Jeffery Brier
*Assistant Examiner*—Wesner Sajous
(74) *Attorney, Agent, or Firm*—William J. Burke

(57) ABSTRACT

Compressed bitstreams are characterized by generated graphical displays that display useful information related, for example, to the quality of the data contained in the bitstream. One set of graphical displays indicates lead time between receipt of packetized data and the corresponding decode or presentation time-stamp. Another set of bar graphical displays provides information related to bits per picture by (A) indicating fractions of useful bits versus zero-stuffing bits per picture, (B) distinguishing field pictures from frame pictures, and (C) plotting bars as a function of presentation or decode time rather than picture number to indicate the presence of 3:2 pulldown frame structure in the bitstream. Yet another set of graphical displays corresponds to coefficient/quantization (C/Q) diagrams that plot combinations of quantization level and number of non-zero quantized coefficients for sets of picture blocks.

49 Claims, 4 Drawing Sheets

MEASURES FOR CHARACTERIZING COMPRESSED BITSTREAMS

CROSS-REFERENCE TO RELATED APPLICATIONS

This application claims the benefit of the filing date of U.S. provisional application Ser. No. 60/080,716, filed on Apr. 3, 1998.

BACKGROUND OF THE INVENTION

1. Field of the Invention

The present invention relates to data processing, and, in particular, to measures for characterizing compressed video and audio bitstreams.

2. Description of the Related Art

It is known to compress digital video and audio signals for storage and/or transmission for subsequent and/or remote decompression and playback. Algorithms for performing such digital video and audio compression are specified by various groups, such as the Motion Picture Experts Group (MPEG). MPEG standard algorithms, such as MPEG-2, are defined in terms of the syntax of the bitstreams and the process for decoding those bitstreams. Encoders conforming to these standards must be able to generate bitstreams with the defined syntax. Nevertheless, the exact processing implemented by such encoders might not be specified by the standards and can therefore vary from encoder to encoder. Moreover, some encoders can be controlled to generate bitstreams for different applications, such as high-quality playback, which may involve relatively large bitstreams, or real-time transmission, which may involve relatively small bitstreams. Thus, for example, two different MPEG video encoders may generate two different bitstreams from the same digital video input stream, with each bitstream conforming to the syntax rules specified by the MPEG video standard.

Because of this variability in encoding, it is useful to provide measures for characterizing compressed bitstreams, such as the video and audio bitstreams that conform to the MPEG standards. Such measures may provide objective indicators of the relative quality between bitstreams generated by different encoders. Such objective measures may prove even more useful than a direct comparison of the decompressed streams at playback. Moreover, such measures provide an objective mechanism for comparing the quality and other characteristics of compressed bitstreams generated from different input signals.

SUMMARY OF THE INVENTION

The present invention is directed to methods for generating graphical displays based on various measures for characterizing compressed bitstreams, especially those conforming to MPEG video and audio standards.

In one embodiment, the present invention is directed to the generation of a graphical display characterizing a packetized bitstream. A time-stamp is extracted from each packet in the bitstream and an extraction time related to the time at which the time-stamp is extracted from each packet is recorded. The graphical display is generated from the time-stamp and corresponding extraction time for each packet, wherein, for each packet, the graphical display comprises a line segment based on a difference D between the value of the time-stamp and the extraction time.

In an alternative embodiment, the present invention is directed to the generation of a bar graphical display characterizing a video bitstream. Numbers of two or more different types of bits are counted for each picture and the bar graphical display is generated from the numbers of bits for each picture, wherein, for each picture, the bar graphical display comprises a bar whose total length is based on a total number of bits for each picture, wherein, for each picture, the fraction of a first type of bits is depicted differently in the bar from the fraction of a second type of bits.

In another alternative embodiment, the present invention is directed to the generation of a bar graphical display characterizing a video bitstream. A time-stamp is extracted for each picture in the bitstream and a number of bits is counted for each picture. The bar graphical display is generated from the time-stamp and corresponding number of bits for each picture, wherein, for each picture, the bar graphical display comprises a bar whose length is based on the number of bits and whose position is based on the value of the time-stamp.

In yet another alternative embodiment, the present invention is directed to the generation of a bar graphical display characterizing a video bitstream. A number of bits is counted for each picture and the bar graphical display is generated from the number of bits for each picture, wherein, for each picture, the bar graphical display comprises a bar whose length is based on the number of bits, wherein a bar representing a field of a frame picture is depicted differently from a bar representing a field of a field picture.

In still another alternative embodiment, the present invention is directed to the generation of a graphical display characterizing a video bitstream. A quantization level used for each of a plurality of blocks in a picture is identified and a number of non-zero quantized coefficients is counted for each block in the picture. The graphical display is generated from the quantization levels and the numbers of non-zero quantized coefficients, wherein, for each block, the graphical display comprises a point having a first coordinate corresponding to the quantization level for the block and a second coordinate corresponding to the number of non-zero quantized coefficients for the block.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
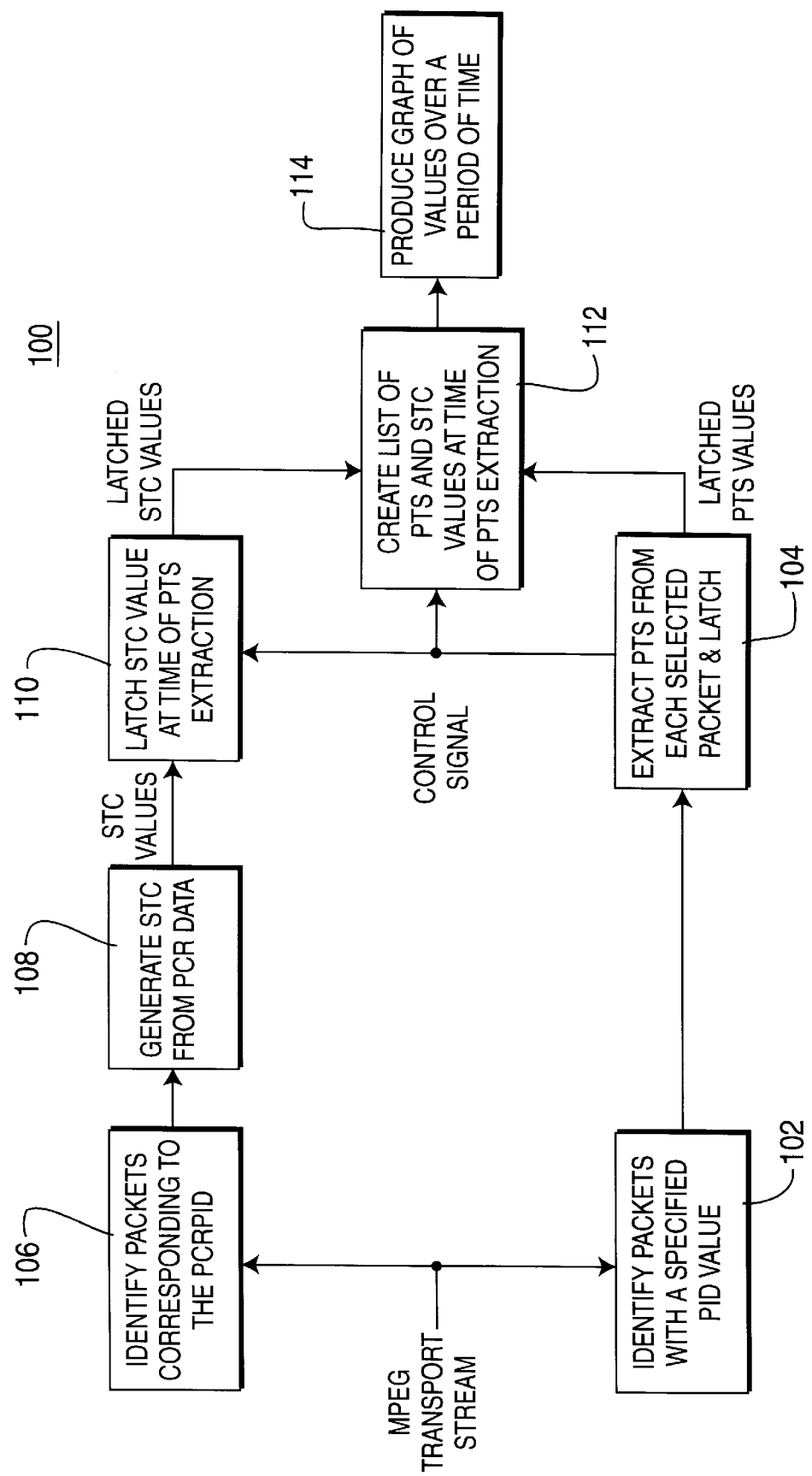
FIG. 1 shows a block diagram of a system for producing a graphical display comparing packet receipt times for an MPEG transport stream with time-stamp data, according to one embodiment of the present invention.

Characteristics Related to Time of Packet Reception

In systems like MPEG-2, audio, video, and data may be multiplexed into a transport stream. A transport stream consists of transport packets containing a variety of elementary streams. Packets of each elementary stream within the transport stream are identified by a unique packet identifier or PID. Streams of packets with a particular PID can carry information which represents video, audio, or data, combined into a packetized elementary stream (PES). Groups of related streams can be combined into programs. A program might contain a video PES stream, several different sets of data PES streams, and one or more different audio PES streams. Several programs may be multiplexed into a single transport stream. For simplicity, each stream encoded into transport stream packets with a particular packet identifier is referred to as a PID stream. The transport stream, therefore, is composed of one or more multiplexed PID streams.

These streams may be referred to as "video streams," "audio streams," or "data streams" depending on the type of information carried in them.

In each MPEG transport stream, one PID stream (e.g., the video stream) contains program clock reference (PCR) data that the decoder uses to generate its own local clock signal, referred to as the system time clock (STC). The PID stream with the PCR data is referred to as the PCR_PID stream. The decoder identifies packets in the received transport stream that are labeled with the PCR_PID, extracts the PCR data from those packets, and uses that data to generate the STC. The other PID streams in the transport stream are slaved to the PCR_PID stream.

According to the MPEG-2 standard, an access unit is a coded representation of a presentation unit. In the case of audio, an access unit is the coded representation of an audio frame. In the case of video, an access unit includes all the coded data for a picture, and any stuffing that follows it, up to but not including the start of the next access unit. In general, depending on the situation, an MPEG-2 access unit may be represented in a bitstream by one or more PES packets, or a single PES packet may correspond to two or more access units. For purposes of this specification, it is assumed that there is a one-to-one relationship between access units and PES packets, with each PES packet corresponding to a single access unit. Those skilled in the art will understand that the present invention can be applied to situations in which there is not a strict one-to-one relationship between access units and PES packets.

MPEG-2 PES packet headers, whether corresponding to the PCR_PID or not, may contain a presentation time-stamp (PTS) that identifies when the data in the corresponding packet should be presented during playback. The decoder compares the PTS value for a packet with its locally generated STC data to determine when to present the corresponding decoded data. In addition, MPEG video PES packets may have a decode time-stamp (DTS) that identifies when the decoding of the data in the corresponding packet should be completed. The decoder compares the DTS value for a packet to the STC data to schedule decoding of the corresponding encoded data. DTS data apply only to MPEG video bitstreams for which, under bi-directional encoding, pictures may be encoded in the bitstreams out of time sequence. MPEG audio bitstreams have only PTS data. If an MPEG video bitstream has no DTS data, then the DTS value for a packet is set equal to the PTS value.

It is useful to characterize the timing of the receipt of PES packets for an MPEG bitstream at a decoder. This can be done by comparing the STC values when PES packets are received with the PTS and DTS data contained in those PES packets. Such comparisons will provide an indication of the lead time being provided to an MPEG decoder to handle its processing requirements.

FIG. 1 shows a block diagram of a system 100 for producing a graphical display comparing PES packet receipt times for an MPEG transport stream with either PTS or DTS data, according to one embodiment of the present invention. System 100 can be used for either video or audio streams. System 100 may be used to generate a graphical display for any one of the PES streams in an MPEG transport stream, whether the PCR_PID stream (containing the PCR data) or one of the other PES streams.

In particular, block 102 of system 100 receives an MPEG transport stream, which has been demodulated to a bit or byte sequence, and identifies those packets whose PID value is equal to the PID value for a selected PES stream in the transport stream. Block 104 extracts and latches the time-stamp information (PTS or DTS) from each identified packet.

At the same time, block 106 receives the original MPEG transport stream and identifies those packets whose PID value is equal to the PCR_PID value signifying the PES stream in the transport stream containing the PCR data. Depending on the selected PES stream, these may or may not be the same packets as those identified in block 102. Block 108 generates the system time clock from the PCR data contained in the PCR_PID packets. Block 108 may be implemented using an STC recovery circuit such as that described in the MPEG standard, or by any other appropriate way of re-creating system time.

Block 110 receives the STC data from block 108 and latches specific STC values based on control signals generated by block 104. Block 104 generates the control signals based on the timing of the extraction of time-stamp values from the packets identified by block 102. In other words, whenever block 104 extracts a time-stamp value from a packet, block 110 latches the current STC value. These latched time-stamp values from block 104 and corresponding latched STC values from block 110 are received by block 112, which, based on the same control signals from block 104, generates entries for a list of corresponding data that is used by block 114 to generate the graphical display of this timing data.

For example, the difference between a PTS value extracted from a PES packet and the corresponding STC value at which that PTS value is extracted indicates how much lead time the decoder has between receipt of the PES packet and the time at which the decoder will have to present the data decoded from that PES packet. Similarly, the difference between a DTS value extracted from a PES packet and the corresponding STC value at which that DTS value is extracted indicates how much lead time the decoder has between receipt of the PES packet and the time at which the decoder will need to have completed the decoding of the encoded data in that PES packet.

Figure 2:
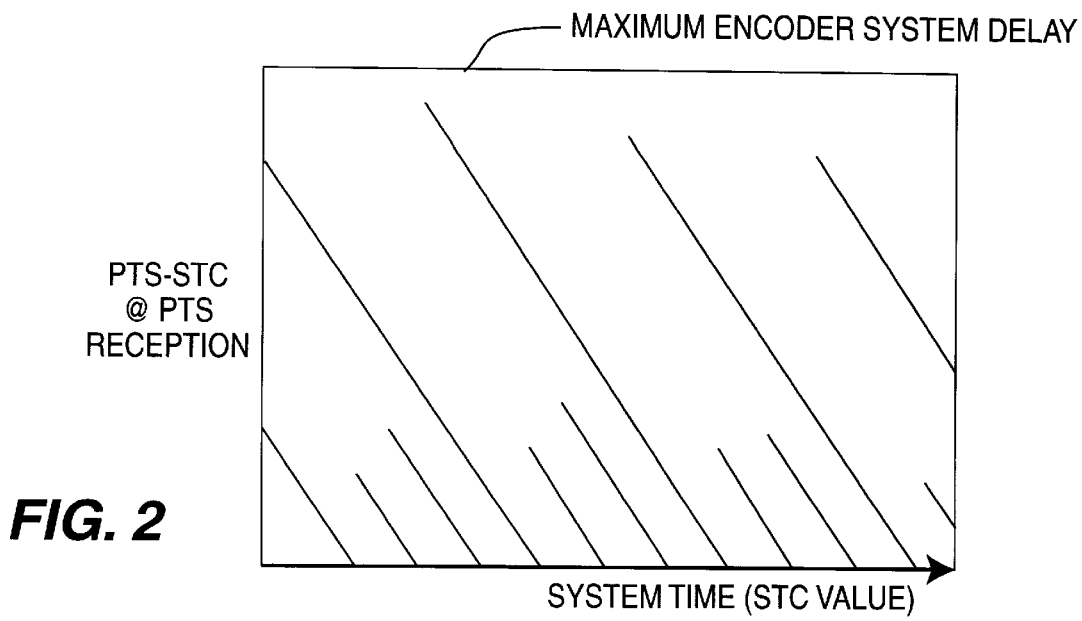
FIG. 2 shows a sample of a graphical display comparing packet receipt time and corresponding presentation time-stamp data generated by the system of FIG. 1, according to one embodiment of the present invention.

FIG. 2 shows a sample of a graphical display comparing PES packet receipt time and corresponding PTS data generated by system 100 of FIG. 1, according to one embodiment of the present invention. In particular, FIG. 2 presents a graphical representation of the difference between the PTS value for a packet and the STC value indicating the time at which the packet was received (or, more accurately, the time at which the PTS value was extracted from the received packet). Each pair of corresponding PTS and STC values (i.e., PTSi, STCi) is depicted as a line segment starting at the point (STCi, PTSi-STCi) and ending at the point (PTSi, 0), where the X axis corresponds to STC time and the Y axis corresponds to the "time till presentation" of the corresponding packet data. Thus, each diagonal line segment in FIG. 2 corresponds to a different PES packet and provides a visual indication of the lead time between packet reception and presentation time. The vertical dimension of the graph is bounded by the maximum delay possible for the encoder system, while the horizontal dimension may correspond to the data for a selected time period (e.g., the last one second).

Figure 3:
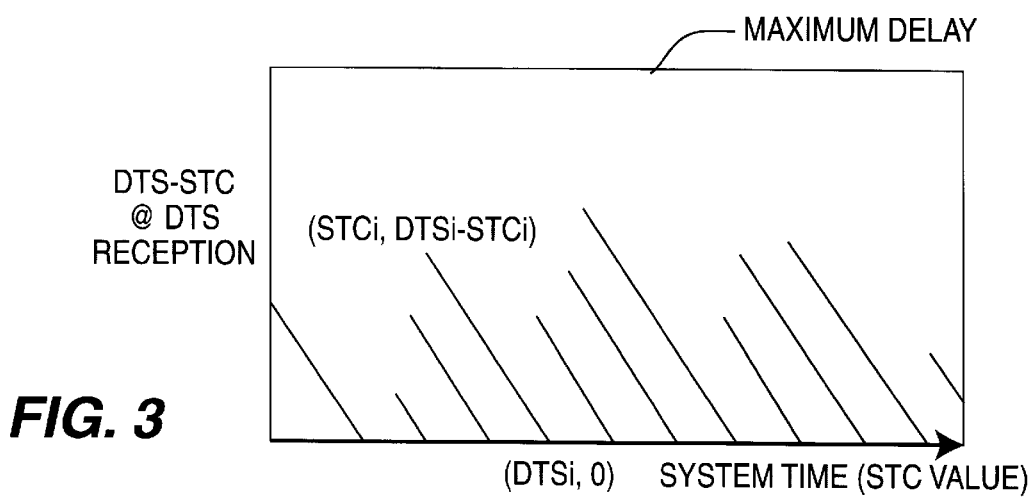
FIG. 3 shows a sample of a graphical display comparing packet receipt time and decode time-stamp data generated by the system of FIG. 1, according to an alternative embodiment of the present invention.

FIG. 3 shows a sample of a graphical display comparing PES packet receipt time and DTS data generated by system 100 of FIG. 1, according to an alternative embodiment of the present invention. FIG. 3 is similar to FIG. 2, with PES packet DTS data being used instead of PTS data. As such, in FIG. 3, the Y axis may be interpreted to correspond to "time till decode completion" for the corresponding packet data. Thus, each diagonal line segment in FIG. 3 corresponds to a different PES packet and provides a visual indication of the lead time between packet reception and decode completion time. The vertical dimension of the graph is bounded by the maximum delay possible for the bitstream, while the horizontal dimension may correspond to the data for a selected time period (e.g., the last one second). In FIG. 3, the vertical dimension is bounded by the maximum delay possible for the bitstream.

The following are some features that can be implemented, according to alternative embodiments of the present invention:

Since the type of picture (i.e., I, P, D) is encoded into each video PES packet, each diagonal line segment in FIGS. 2 and 3 can be color coded to indicate the corresponding picture type. This can be useful because different picture types typically involve different amounts of data. I and P pictures, for example, typically have more data than B pictures and therefore typically require more lead time to decode. When bi-directional encoding is used, certain PTS-based line segments should even be longer to reflect the fact that certain pictures appear in the bitstream out of time sequence.

Color coding can also be applied to the X axis to indicate the period of time that each packet was being received, with the color indicating the picture type corresponding to the packet. In addition, hash marks can be added to the X axis to indicate the end and beginning of successive B pictures.

The display may be updated by having the line segments scroll smoothly in real time from right to left with segments for recently received data packets being added at the right end of the display. Alternatively, the entire display can be periodically refreshed as a whole (e.g., once for every time period presented). Alternatively, the display can be refreshed with a wipe type of update (such as the wiping of a radar screen). In this case, the STC axis would have a sliding break in it to indicate the current location of the wipe.

Instead of plotting the time of reception of the start of a picture (i.e., reception of the PES packet header), PTS-STC or DTS-STC may be plotted as a function of the time of reception of the end of the picture (i.e., completion of the reception of the packet as indicated by the beginning of the next packet header).

The entire graph can be rotated, e.g., by +/−45 degrees such that the X and Y axes are diagonal and the line segments are either horizontal or vertical.

The method of illustrating PTS data can be applied to non-video streams as well, including audio streams. If addition, data for two or more different programs from the same transport stream (e.g., video and one or more corresponding audio streams) can be overlaid on the same display, since they share the same system time base, with line segments corresponding to different programs being indicated by color coding or type of line (e.g., solid, dotted, dashed) or some other means.

Blocks 102–112 of system 100 may be implemented as part of a plug-in board to a personal computer having graphics software designed to implement block 114. System 100 may be used to generate graphical displays similar to FIGS. 2 and 3 for either constant bit rate systems or variable bit rate systems.

Characteristics Related to Numbers of Bits per Picture

Figure 4:
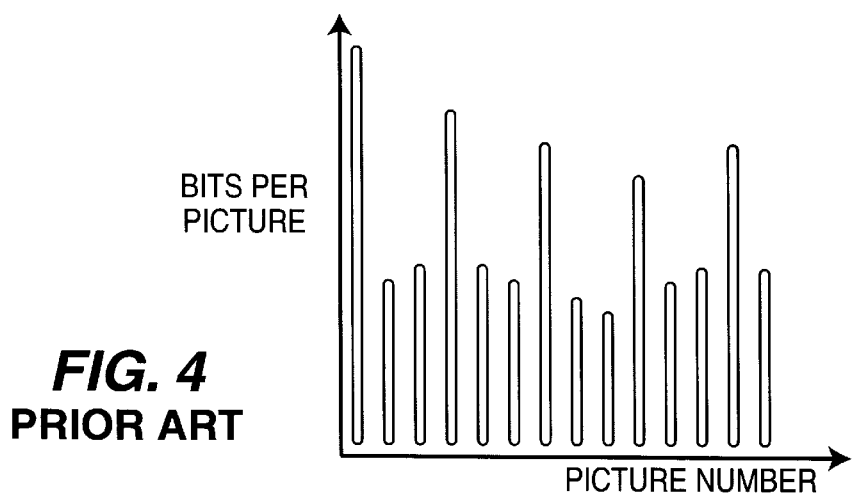
FIG. 4 is an example of a prior-art graphical displays indicating the total number of bits that occur between the start codes of successive pictures in a video bitstream.

It is also desirable to indicate the relative number of bits used to encode each of the pictures in an MPEG video bitstream. It is known to generate graphical displays that indicate the total number of bits that occur between the start codes of successive pictures in a video bitstream. FIG. 4 is an example of such a display in which the number of bits between each successive pair of pictures is indicated as a single bar in a bar graph plotting numbers of bits (Y axis) as a function of picture number (X axis), where the picture number may be in transmission order or display order, and the bars may be color coded to indicate picture type. Such displays, however, provide only a limited amount of information. For example, they do not distinguish the number of bits actually used to encode the picture data from the zero-stuffing bits that may be inserted into an MPEG bitstream.

Figure 5:
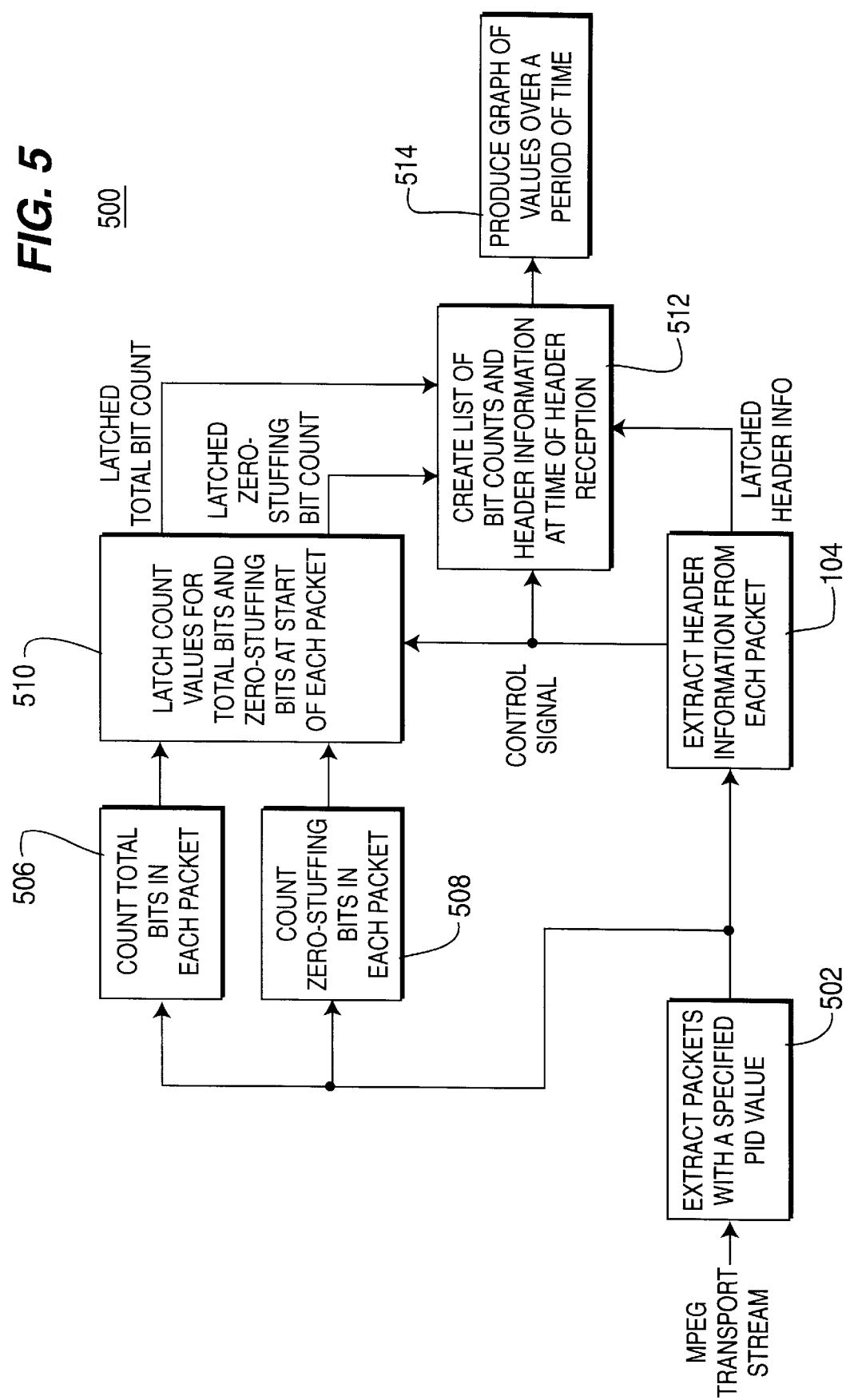
FIG. 5 shows a block diagram of a system for producing a graphical display indicating information related to numbers of bits per picture, according to one embodiment of the present invention.

FIG. 5 shows a block diagram of system 500 for producing a graphical display indicating information related to numbers of bits per picture, according to one embodiment of the present invention.

In particular, block 502 of system 500 receives an MPEG transport stream and identifies those PES packets whose PID value is equal to the PID value for a selected video PES stream in the transport stream. Block 504 extracts and latches certain header information from each identified packet. In particular, block 504 may search the input stream for header information in the PES header, the Sequence header, and/or the Picture header. The extracted header information may include such MPEG variables as PTS, DTS, frame_rate, bit_rate, vbv_buffer_size, progressive_sequence, picture_coding_type, picture_structure, temporal_reference, and/or repeat_first_field.

At the same time, block 506 counts the total number of bits in each packet, while block 508 counts the number of zero-stuffing bits in each packet. Depending on the implementation, block 506 may exclude transport header bits, adaptation bits, and PES header bits. Zero-stuffing bits may be defined as those bits contained in bytes having hex value (00) that occur after two bytes of hex value (00). Zero-stuffing bits precede a start code, such as a picture start code. Alternatively, block 508 may count other stuffing bits, such as adaptation field stuffing bytes in addition to or instead of the zero-stuffing bits.

Block 510 receives the counts of bits from blocks 506 and 508 and latches those values based on control signals generated by block 504. Block 504 generates the control signals based on the timing of the extraction of header information from the packets identified by block 502 (e.g., at the start of a video access unit). In other words, whenever block 504 extracts header information from a packet, block 510 latches the current total bit count value and the current zero-stuffing bit count value. The header information from block 504 and corresponding latched bit count values from block 510 are received by block 512, which, based on the same control signals from block 504, generates entries for a list of corresponding data that is used by block 514 to generate the graphical display of this bit-related data.

By separately counting the total number of bits and the number of zero-stuffing bits in each packet, displays can be generated that simultaneously indicate both the total number of bits per packet as well as the fraction of those bits actually used to encode the corresponding picture (i.e., "the useful bits") as compared with the fraction inserted as zero-stuffing bits into the corresponding packet.

Figure 6:
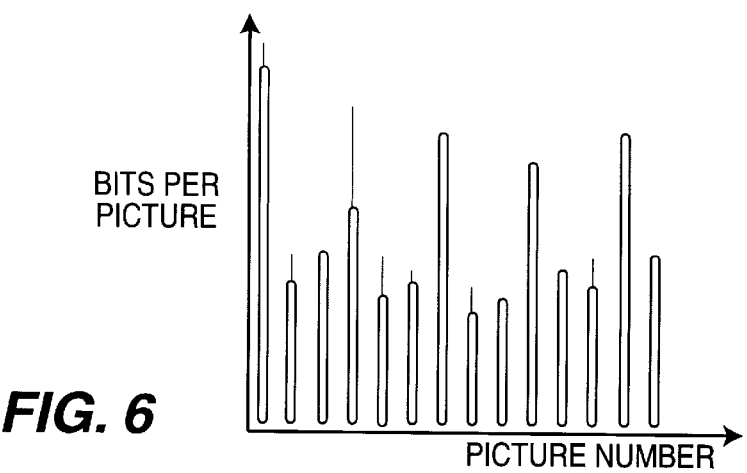
FIG. 6 shows a sample of a graphical display depicting fractions of useful bits and zero-stuffing bits for each picture in a video bitstream based on data generated by the system of FIG. 5, according to one embodiment of the present invention.

FIG. 6 shows a sample of a graphical display depicting fractions of useful bits and zero-stuffing bits for each picture in a video bitstream based on data generated by system 500 of FIG. 5, according to one embodiment of the present invention. In particular, FIG. 6 presents a bar graph in which each bar corresponds to a picture and the total height of each bar corresponds to the total number of bits in the packet used to encode that picture. in FIG. 6, each bar has a thick portion indicating the fraction of the total bits that are useful bits and a thin portion indicating the fraction of the total bits that are zero-stuffing bits. Here, too, the bars can be color coded to indicate different picture types. Alternatively, the fractions of useful and zero-stuffing bits can be distinguished in ways other than thickness of bar, such as by shading or color coding.

Figure 7:
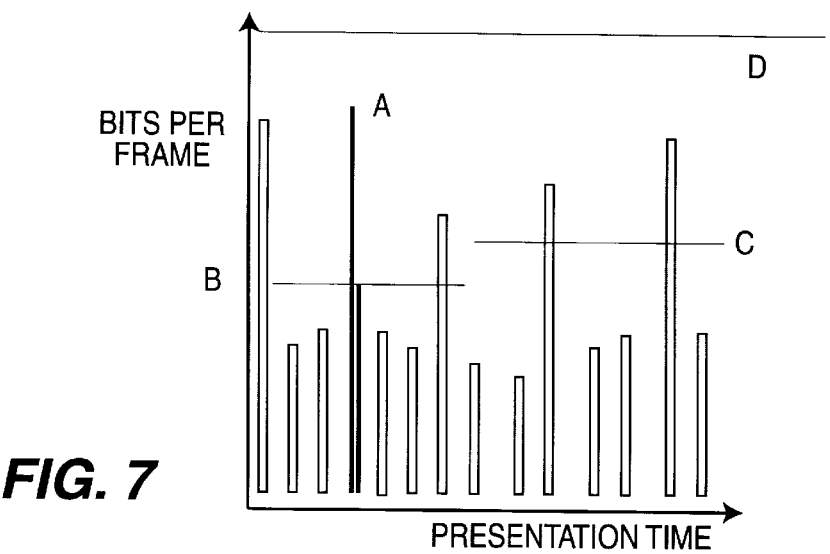
FIG. 7 shows a sample of a graphical display depicting other information related to numbers of bits based on data generated by a system similar to the system of FIG. 5, according to an alternative embodiment of the present invention.

FIG. 7 shows a sample of a graphical display depicting other information related to numbers of bits based on data generated by a system similar to system 500 of FIG. 5, according to an alternative embodiment of the present invention. MPEG standards support two kinds of pictures: field pictures, in which each image is based on a single field of pixel data, and frame pictures, in which each image is based on two fields of pixel data. FIG. 7 presents a bar graph in which thick bars correspond to frame pictures and pairs of thin bars correspond to the two field pictures used to encode a single video frame. In order to present the information in a useful manner, the scale used for the thick bars corresponding to frame pictures is twice that used for the thin bars corresponding to field pictures, since each field picture typically takes about half the number of bits to encode as a frame picture, for the same picture type. Thus, in FIG. 7, a thin bar would represent half as many bits as a thick bar of the same height.

In addition, FIG. 7 plots the bars as a function of presentation time (i.e., using the PTS value in each packet to determine the location of the corresponding bar along the X axis) rather than picture number. In this way, a relatively large gap between successive bars would indicate the existence of a 3:2 pulldown frame structure in the bitstream. Alternatively, the bars may be plotted as a function of decode time (i.e., using the DTS value in each packet for the X axis)

Average bits per picture (ABPP) may be calculated by dividing the bit_rate parameter by the frame_rate parameter. For a frame picture with the repeat_first_field parameter set, and for the following frame picture, the value of ABPP is raised by a factor of 5/4, because it takes five field times to show the four fields (i.e., two frames) in MPEG-2 encoding. ABPP is shown as a horizontal line (B in FIG. 7) that overlays the bar graph. When 3:2 pulldown is enabled, then this value of bits per picture goes up, as shown in line C in FIG. 7. Another line (D) may be drawn at the maximum bits per pictures level as defined by the MPEG standard or it may simply be based on the vbv_buffer_size parameter.

Like the blocks in system 100 of FIG. 1, blocks 502–512 of system 500 of FIG. 5 may be implemented as part of a plug-in board to a personal computer having graphics software designed to implement block 514. System 500 may be used to generate graphical displays similar to FIGS. 6 and 7 for either constant bit rate systems or variable bit rate systems. Moreover, system 500 may be combined with system 100 of FIG. 1 into a single combined system having all of the capabilities of both systems 100 and 500. Such combined systems may be used to generate graphical displays representing other characteristics of MPEG video and audio bitstreams. Some of these characteristics are described in the following sections.

Characteristics Related to Data Quantization

In MPEG video processing, a discrete cosine transform (DCT) is applied to blocks of pixels or inter-frame pixel differences to generate blocks of DCT coefficients. These DCT coefficients may then be quantized and the resulting quantized coefficients may be further encoded (e.g., using run-length and Huffman encoding) to generate compressed data for the video bitstream. Quantization may be applied at different quantization levels that can change both from block to block within a picture as well as between pictures. Typically, quantization causes some of the quantized coefficients in each block to be zero. The stronger the level of quantization, the greater the number of quantized coefficients having a value of zero. The number of zero quantized coefficients for a given quantization level typically depends on the type imagery being processed. High-contrast imagery will typically have fewer zero quantized coefficients for a given quantization level than low-contrast imagery. On the other hand, quantization errors in the intensity data corresponding to low-contrast imagery are more noticeable to the human eye than similar errors in high-contrast imagery. As a result, high-contrast imagery can be quantized at a higher level than low-contrast imagery without adversely affecting the fidelity of the video playback. The quantization level and the resulting number of zero quantized coefficients affects such (sometimes competing) characteristics as bit rate and playback fidelity. Higher quantization level usually means lower bit rate and lower playback fidelity.

Figure 8:
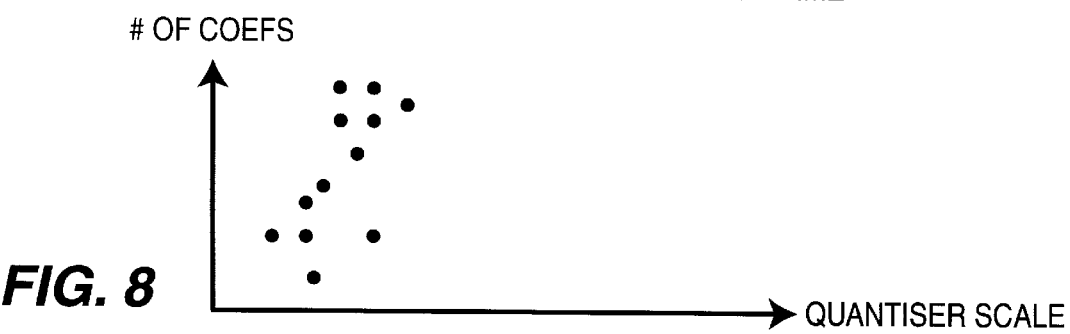
FIG. 8 shows an example of a coefficient/quantization (C/Q) diagram, according to one embodiment of the present invention.

FIG. 8 shows an example of a coefficient/quantization (C/Q) diagram, according to one embodiment of the present invention. A C/Q diagram shows the distribution and frequency of occurrence of different combinations of quantization level and number of non-zero quantized coefficients (i.e., the number of coefficients that "survive" the quantization process). In particular, the X axis in FIG. 8 corresponds to quantization levels and the Y axis corresponds to numbers of non-zero quantized coefficients. Each point in a C/Q diagram is based on the quantization level applied to a particular block of DCT coefficients and the resulting number of non-zero quantized coefficients. A C/Q diagram can be generated by a separate piece of test equipment or by an encoder (as a video stream is compressed) or by a decoder (as a video bitstream is decompressed).

The distribution of points in a C/Q diagram conveys useful information about the selection of quantization levels made by an MPEG encoder. The displayed results can be used in a variety of ways, including:

- Checking for "out-liers," that is, points corresponding to either a much higher or lower quantization level than other points with a similar number of non-zero coefficients;
- Seeing the general trend and slope of the distribution of points;
- Seeing if the encoding method uses all possible values of quantization level, or whether it limits those values to a range.
- Comparing a system operating with two different quantization matrices to see if one causes limiting of the number of non-zero coefficients.

The following are some features that can be implemented, according to alternative embodiments of the present invention:

Since there are a finite number of specific quantization levels (e.g., 31 quantization levels numbered along the X axis from 1 to 31) and a finite number of different numbers of non-zero coefficients (e.g., 0 to 64 numbered along the Y axis), there are a finite number of possible combinations of quantization level and number of non-zero coefficients. For a typical video picture, a given combination may occur more than once for different blocks in the picture. In one embodiment, the intensity of each point in a C/Q diagram may be used to indicate the relative frequency of occurrence of that combination in the picture, such that, the more frequent the combination, the more the point's intensity differs from the display background. For example, in a "light-on-dark" display, brighter points would signify more occurrences of the corresponding combination.

The frequency of combinations could be indicated by "blooming," where the number of display elements illuminated in a particular region of a C/Q diagram corresponding to a specific combination of quantization level and number of non-zero coefficients, is a function of the number of occurrences of that combination. For example, the region of a C/Q diagram corresponding to the combination of quantization level 8 and 5 non-zero coefficients could be represented by a square defined by four adjacent display elements located at (16,10), (16,9), (15,10), and (15,9), where the X and Y axes are expanded by a factor of two and all four points correspond to the same combination. In this example, if the combination occurs 1 to 5 times in a picture, then only display element (16,10) is illuminated; if the combination occurs 6 to 20 times, then illuminate display elements (16,10) and (16,9); if the combination occurs 21 to 50 times, then illuminate display elements (16,10), (16,9), and (15, 10); and if the combination occurs more than 50 times, then illuminate all four display elements. Note that the thresholds for illuminating an additional display element need not be linearly spaced.

Blooming can be allowed to intrude another combination's display region. Extending the previous example, if the combination occurs more than 100 times, then also illuminate display element (16,11); and if the combination occurs more than 300 times, then also illuminate display element (15,11), even though these display elements correspond to one or more other combinations (e.g., a quantization level of 8 with 6 non-zero coefficients).

In displays having gray-scale or variable colors, the frequency of occurrence of combinations can be indicated both with varied intensities and by blooming, where, for example, intensity is adjusted before blooming is used.

Figure 9:
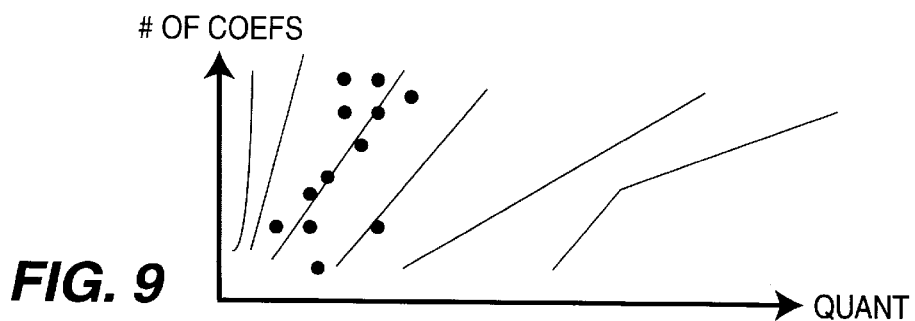
FIG. 9 shows an example of a C/Q diagram in the overlaid dashed lines function as graticule lines, corresponding to combinations that have been empirically determined to correspond to particular viewer quality levels.

Since certain combinations of quantization level and number of non-zero coefficients typically make worse pictures than other combinations, a scale can be placed on a C/Q diagram to indicate what the effect of those combinations might be on quality. FIG. 9 shows an example of a C/Q diagram in which the overlaid dashed lines function as graticule lines, corresponding to combinations that have been empirically determined to correspond to particular viewer quality levels. Note that the graticule lines need not be straight. The individual graticule lines can be labeled according to an appropriate scale (e.g., 1 to 10, where 1 is the lowest quality and 10 is the highest quality). Note that the graticule lines at the center of the scale may correspond to more desirable encoding characteristics than the graticule lines at either end of the scale.

The data for one or more pictures may be presented simultaneously in a single C/Q diagram with data for different types of pictures (e.g., I, P, and B) indicated using different colors on the same graph with the axes slightly offset for each picture type so that the colors are shown clearly. Since anchor pictures (I and P) may be more important than B picture, data for I and P pictures may be combined in a single color (or set of colors). Pictures that are used to predict other pictures may be combined in one color set, with other pictures (e.g., isolated I pictures, P pictures that are not used to predict B pictures, and all B pictures) combined in another color set.

A display may contain two or more different C/Q diagrams. For example, data for I, P, and B pictures could be displayed on three different C/Q diagrams, or anchor pictures (I and P) could be combined in a single C/Q diagram. Similarly, data for intra coded and predicted blocks could be display on different C/Q diagrams.

The user may be provided with the ability to zoom in one a section of a C/Q diagram.

In MPEG-2, quantization levels may be non-linear, where equal numerical change in the parameter used to indicate quantization level does not necessarily result in an equal quality change. As such, the quantization level axis (i.e., the X axis in FIGS. 8 and 9) may be made non-linear, e.g., logarithmic.

Since the impact of an additional non-zero coefficient may be more significant when there are fewer coefficients, the Y axis corresponding to numbers of non-zero coefficients can be made non-linear, e.g., logarithmic. In an alternative implementation, the Y axis can be made linear for small values, then logarithmic for larger values.

Since the size of non-zero coefficients may be as significant as the number of non-zero coefficients, the Y axis can be made to represent the number of bits used for non-DC coefficients, instead of the absolute number of coefficients.

C/Q diagrams like those of FIGS. 8 and 9 ignore skipped blocks and macroblocks. The MPEG algorithm provides two ways to skip image parts: skip entire macroblocks or skip individual blocks. Since skipped areas are displayed, they contribute to the total picture quality and it would therefore be helpful to indicate the quality of skipped areas. Points along the quantization level axis can be used to indicate the occurrence of skipped blocks and macroblocks. When non-zero motion prediction is used, such a point may correspond to the current quantization level, that is, the quantization level in the previously used macroblock. When zero motion prediction is used, such a point may correspond to the quantization level of the pixels which will be displayed at that location. Thus, if the picture is a P picture and if a macroblock is skipped, then the quantization level is the value from that macroblock in the previous I or P picture. Alternatively, for a skipped area, an approximate quantization level can be computed for the signals from which the skipped area is predicted, and used to determine the location of the point along the Y axis.

Since perception of chroma errors is different from luma errors, the scales used for chroma blocks may be different. In that case, data for chroma blocks and luma blocks are accumulated separately. The different data can be shown using different color coding, or on separate C/Q diagrams which may have different scales, or by selectively including chroma data in the display.

While it may be interesting to show an entire pre-compressed sequence, for real-time signals, an appropriate level of persistence may need to be provided. This may involve simulating phosphor persistence, and varying that persistence depending on GOP structure. On a real-time C/Q diagram, several pictures worth of information (e.g., the last N pictures) can be shown at one time. Alternatively, data for all pictures that contribute to the current picture (e.g., data for I and P pictures that are used to predict the current picture in addition to the data for the current picture) can be displayed at one time. Alternatively, data for all blocks that contribute to the current picture can be displayed at one time.

Data for pictures can be displayed in display order or in the order in which they occur in the bitstream.

Filtering may be provided to enable the user to select only data derived from selected portions of the image. The selected portions can be specified in terms of rows or one or more rectangular regions on macroblock boundaries.

Since the human eye is more sensitive to variations in dark areas than in light areas, it may be desirable to show data from dark areas of an image, ignoring data from light areas. This can be accomplished by filtering the data on a block-by-block basis based on specified levels of luminance.

Quantization level alone may not be the most appropriate parameter. In one alternative embodiment, the X axis can correspond to a "visibility" number rather than quantization level, where visibility is a function of quantization level and block DC level.

There may be interest in analyzing the performance of several video streams that are multiplexed "statistically" into one transport stream. For this, data for multiple C/Q diagrams may be observed jointly, by displaying data derived from several video streams on one diagram at the same time.

Although the present invention has been described in the context of MPEG video and audio standards, those skilled in the art will understand that the present invention can be implemented for encoders, bitstreams, and decoders other than those that conform to MPEG video and audio standards.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating a graphical display characterizing a packetized bitstream, comprising the steps of:
   (a) extracting a time-stamp from each packet in the bitstream;
   (b) recording the extracting time related to the time at which the time-stamp is extracting from each packet; and
   (c) generating the graphical display from the time-stamp and corresponding extraction time for each packet, wherein, for each packet, the graphical display comprises a line segment based on a difference D between the value of the time-stamp and the extraction time.

2. The invention of claim 1, wherein the graphical display has a first axis corresponding to time and a second axis corresponding to the difference D.

3. The invention of claim 2, wherein the first axis is a horizontal X axis, the second axis is a vertical Y axis, and the line segments are diagonal line segments.

4. The invention of claim 2, wherein:
   each line segment connects a start point and an end point;
   the start point has a first coordinate based on the extraction time and a second coordinate based on the difference D; and
   the end point has a first coordinate based on the time-stamp and a second coordinate of zero.

5. The invention of claim 2, wherein the display of the first axis indicates the timing of reception of different packets.

6. The invention of claim 1, wherein the time-stamp is one of a presentation time-stamp and a decode time-stamp, and the bitstream comprises at least one of audio data and video data.

7. The invention of claim 6, wherein the bitstream comprises video data and each line segment is color coded to indicate a picture type corresponding to each packet.

8. The invention of claim 1, wherein step (b) further comprises the step of generating a system time clock based on clock reference data extracted from the bitstream, wherein the extraction time is based on the system time clock.

9. The invention of claim 8, comprising the step of extracting the clock reference data from a program in the bitstream different from the program from which the time-stamps are extracted.

10. The invention of claim 1, wherein graphs of line segments from two or more different programs of a single transport stream are overlaid.

11. The invention of claim 1, wherein:
   the graphical display has a first axis corresponding to time and a second axis corresponding to the difference D;
   the first axis is a horizontal X axis, the second axis is a vertical Y axis, and the line segments are diagonal line segments;
   each line segment connects a start point and an end point;
   the start point has a first coordinate based on the extraction time and a second coordinate based on the difference D;
   the end point has a first coordinate based on the time-stamp and a second coordinate of zero;

the display of the first axis indicates the timing of reception of different packets;

the time-stamp is one of a presentation time-stamp and a decode time-stamp, and the bitstream comprises at least one of audio data and video data;

step (b) further comprises the step of generating a system time clock based on clock reference data extracted from the bitstream, wherein the extraction time is based on the system time clock;

comprising the step of extracting the clock reference data from a program in the bitstream different from the program from which the time-stamps are extracted; and graphs of line segments from two or more different programs of a single transport stream are overlaid.

12. The invention of claim 11, wherein the bitstream comprises video data and each line segment is color coded to indicate a picture type corresponding to each packet.

13. A computer-readable medium having stored thereon a plurality of instructions, the plurality of instructions including instructions which, when executed by a processor, cause the processor to implement a method for generating a graphical display characterizing a packetized bitstream, the method comprising the steps of:

(a) extracting a time-stamp from each packet in the bitstream;

(b) recording the extraction time related to the time at which the time-stamp is extracted from each packet; and (c) generating the graphical display from the time-stamp and corresponding extraction time for each packet, wherein, for each packet, the graphical display comprises a line segment based on a difference D between the value of the time-stamp and the extraction time.

14. A method for generating a bar graphical display characterizing a video bitstream, comprising the steps of:

(a) counting numbers of two or more different types of bits for each picture; and (b) generating the bar graphical display from the numbers of bits for each picture, wherein, for each picture, the bar graphical display comprises a bar whose total length is based on a total number of bits for each picture, wherein, for each picture, the fraction of a first type of bits is depicted differently in the bar from the fraction of a second type of bits.

15. The invention of claim 14, wherein the video bitstream is a PES stream, wherein each picture corresponds to a packet in the PES stream.

16. The invention of claim 14, wherein bits of the first type are useful bits and bits of the second type are zero-stuffing bits.

17. The invention of claim 14, wherein, for each bar, a portion of the bar corresponding to the first type of bits has a different thickness than a portion of the bar corresponding to the second type of bits.

18. The invention of claim 14, wherein each bar is color coded to indicate a picture type of the corresponding picture.

19. The invention of claim 14, wherein a bar representing a field of a frame picture is depicted differently from a bar representing a field of a field picture.

20. The invention of claim 14, wherein:

the video bitstream is a PES stream, wherein each picture corresponds to a packet in the PES stream;

bits of the first type are useful bits and bits of the second type are zero-stuffing bits;

for each bar, a portion of the bar corresponding to the first type of bits has a different thickness than a portion of the bar corresponding to the second type of bits;

each bar is color coded to indicate a picture type of the corresponding picture; and a bar representing a field of a frame picture is depicted differently from a bar representing a field of a field picture.

21. A computer-readable medium having stored thereon a plurality of instructions, the plurality of instructions including instructions which, when executed by a processor, cause the processor to implement a method for generating a graphical display characterizing a video bitstream, the method comprising the steps of:

(a) counting numbers of two or more different types of bits for each picture; and (b) generating the bar graphical display from the numbers of bits for each picture, wherein, for each picture, the bar graphical display comprises a bar whose total length is based on a total number of bits for each picture, wherein, for each picture, the fraction of a first type of bits is depicted differently in the bar from the fraction of a second type of bits.

22. A method for generating a bar graphical display characterizing a video bitstream, comprising the steps of:

(a) extracting a time-stamp for each picture in the bitstream;

(b) counting a number of bits for each picture; and (c) generating the bar graphical display from the time-stamp and corresponding number of bits for each picture, wherein, for each picture, the bar graphical display comprises a bar whose length is based on the number of bits and whose position is based on the value of the time-stamp.

23. The invention of claim 22, wherein the video bitstream is a PES stream, wherein each picture corresponds to a packet in the PES stream.

24. The invention of claim 22, wherein the time-stamp is a presentation time-stamp.

25. The invention of claim 22, wherein the time-stamp is a decode time-stamp.

26. The invention of claim 22, wherein each bar is color coded to indicate a picture type of the corresponding picture.

27. The invention of claim 22, wherein a bar representing a field of a frame picture is depicted differently from a bar representing a field of a field picture.

28. The invention of claim 27, wherein:

a bar representing a field of a frame picture has a different thickness than a bar representing a field of a field picture;

bars representing corresponding pairs of fields of a frame picture are grouped together in the display; and the height of a bar representing a field of a frame picture is based on a different scale than the height of a bar representing a field of a field picture.

29. The invention of claim 22, wherein:

the video bitstream is a IIES stream, wherein each picture corresponds to a packet in the PES stream;

the time-stamp is one of a presentation time-stamp and a decode time-stamp;

each bar is color coded to indicate a picture type of the corresponding picture;

a bar representing a field of a frame picture is depicted differently from a bar representing a field of a field picture;

a bar representing a field of a frame picture has a different thickness than a bar representing a field of a field picture;

bars representing corresponding pairs of fields of a frame picture are grouped together in the display; and the height of a bar representing a field of a frame picture is based on a different scale than the height of a bar representing a field of a field picture.

30. A computer-readable medium having stored thereon a plurality of instructions, the plurality of instructions including instructions which, when executed by a processor, cause the processor to implement a method for generating a graphical display characterizing a video bitstream, the method comprising the steps of:

(a) extracting a time-stamp for each picture in the bitstream;

(b) counting a number of bits for each picture; and (c) generating the bar graphical display from the time-stamp and corresponding number of bits for each picture, wherein, for each picture, the bar graphical display comprises a bar whose length is based on the number of bits and whose position is based on the value of the time-stamp.

31. A method for generating a bar graphical display characterizing a video bitstream, comprising the steps of:

(a) counting a number of bits for each picture; and (b) generating the bar graphical display from the number of bits for each picture, wherein, for each picture, the bar graphical display comprises a bar whose length is based on the number of bits, wherein a bar representing a field of a frame picture is depicted differently from a bar representing a field of a field picture.

32. The invention of claim 31, wherein:

a bar representing a field of a frame picture has a different thickness than a bar representing a field of a field picture;

bars representing corresponding pairs of fields of a frame picture are grouped together in the display; and the height of a bar representing a field of a frame picture is based on a different scale than the height of a bar representing a field of a field picture.

33. The invention of claim 31, wherein the video bitstream is a PES stream, wherein each picture corresponds to a packet in the PES stream.

34. The invention of claim 31, wherein each bar is color coded to indicate a picture type of the corresponding picture.

35. The invention of claim 31, wherein:

a bar representing a field of a frame picture has a different thickness than a bar representing a field of a field picture;

bars representing corresponding pairs of fields of a frame picture are grouped together in the display;

the height of a bar representing a field of a frame picture is based on a different scale than the height of a bar representing a field of a field picture;

the video bitstream is a PES stream, wherein each picture corresponds to a packet in the PES stream; and each bar is color coded to indicate a picture type of the corresponding picture.

36. A computer-readable medium having stored thereon a plurality of instructions, the plurality of instructions including instructions which, when executed by a processor, cause the processor to implement a method for generating a graphical display characterizing a video bitstream, the method comprising the steps of:

(a) counting a number of bits for each picture; and (b) generating the bar graphical display from the number of bits for each picture, wherein, for each picture, the bar graphical display comprises a bar whose length is based on the number of bits, wherein a bar representing a field of a frame picture is depicted differently from a bar representing a field of a field picture.

37. A method for generating a graphical display characterizing a video bitstream, comprising the steps of:

(a) identifying a quantization level used for each of a plurality of blocks in a picture;

(b) counting a number of non-zero quantized coefficients for each block in the picture; and (c) generating the graphical display from the quantization levels and the numbers of non-zero quantized coefficients, wherein, for each block, the graphical display comprises a point having a first coordinate corresponding to the quantization level for the block and a second coordinate corresponding to the number of non-zero quantized coefficients for the block.

38. The invention of claim 37, wherein the video bitstream is a PES stream, wherein each picture corresponds to a packet in the PES stream.

39. The invention of claim 37, wherein the number of occurrences of each combination of quantization level and number of non-zero quantized coefficients is indicated by the intensity of the point.

40. The invention of claim 37, wherein the number of occurrences of each combination of quantization level and number of non-zero quantized coefficients is indicated using blooming.

41. The invention of claim 37, wherein the graphical display further comprises graticule lines providing a quality scale.

42. The invention of claim 37, wherein color coding is used to indicate data for different types of pictures.

43. The invention of claim 37, wherein at least one of the quantization level and the number of non-zero quantized coefficients is plotted along a non-linear axis.

44. The invention of claim 37, wherein the graphical display further comprises an indication of skipped areas in the picture.

45. The invention of claim 37, wherein data for chroma blocks is distinguished from data for luma blocks.

46. The invention of claim 37, wherein the graphical display comprises data for two or more pictures at the same time.

47. The invention of claim 37, wherein the graphical display corresponds to data for a subset of the picture.

48. The invention of claim 37, wherein:

the video bitstream is a PES stream, wherein each picture corresponds to a packet in the PES stream;

the number of occurrences of each combination of quantization level and number of non-zero quantized coefficients is indicated by at least one of the intensity of the point and using blooming;

the graphical display further comprises graticule lines providing a quality scale;

color coding is used to indicate data for different types of pictures;

the graphical display further comprises an indication of skipped areas in the picture; and data for chroma blocks is distinguished from data for luma blocks.

49. A computer-readable medium having stored thereon a plurality of instructions, the plurality of instructions including instructions which, when executed by a processor, cause the processor to implement a method for generating a graphical display characterizing a video bitstream, the method comprising the steps of:

(a) identifying a quantization level used for each of a plurality of blocks in a picture;

(b) counting a number of non-zero quantized coefficients for each block in the picture; and (c) generating the graphical display from the quantization levels and the numbers of non-zero quantized coefficients, wherein, for each block, the graphical display comprises a point having a first coordinate corresponding to the quantization level for the block and a second coordinate corresponding to the number of non-zero quantized coefficients for the block.

* * * * *